United States Patent [19]

Nakagawa

[11] Patent Number: 5,327,185
[45] Date of Patent: Jul. 5, 1994

[54] MOTOR DRIVEN SYSTEM FOR CONTROLLING THE DIAPHRAGM AND SHUTTER OF A CAMERA

[75] Inventor: Tadashi Nakagawa, Chiba, Japan

[73] Assignee: Seikosha Co., Ltd., Tokyo, Japan

[21] Appl. No.: 971,436

[22] Filed: Nov. 4, 1992

[30] Foreign Application Priority Data

Nov. 7, 1991 [JP] Japan .................. 3-291298

[51] Int. Cl.⁵ .............................. G03B 9/08
[52] U.S. Cl. .................. 354/228; 354/234.1
[58] Field of Search ............. 354/228, 229, 230, 231, 354/234.1, 271.1, 435, 439, 440, 441

[56] References Cited

U.S. PATENT DOCUMENTS

| | | | |
|---|---|---|---|
| 4,881,096 | 11/1989 | Ogihara et al. | 354/234.1 X |
| 4,933,695 | 6/1990 | Ishida et al. | 354/234.1 |
| 5,045,873 | 9/1991 | Shinozaki et al. | 354/234.1 |
| 5,060,000 | 10/1991 | Ogihara et al. | 354/234.1 X |
| 5,150,149 | 9/1992 | Alligood et al. | 354/231 X |

FOREIGN PATENT DOCUMENTS 58-90627 5/1983 Japan .
3-89331 4/1991 Japan .

*Primary Examiner*—Michael L. Gellner
*Assistant Examiner*—J. K. Han
*Attorney, Agent, or Firm*—Jordan and Hamburg

[57] ABSTRACT

A motor driven shutter has diaphragm blades and shutter blades controlled by a single motor. The shutter comprises a driving member actuated by the motor, a diaphragm member for setting the diaphragm blades to a predetermined position via the driving member by the forward rotation of the motor, a closing member for operating the diaphragm blades to a closed position, and shutter blades urged in an open direction. The driving member sets the diaphragm blades to a predetermined position and further releases the shutter blades upon motor rotation in the reverse direction in a diaphragm setting process. The driving member closes the diaphragm blades by releasing the engagement of the closing member in the succeeding operation of the motor.

7 Claims, 5 Drawing Sheets

स,327,185

MOTOR DRIVEN SYSTEM FOR CONTROLLING THE DIAPHRAGM AND SHUTTER OF A CAMERA

FIELD OF THE INVENTION

The present invention relates to a motor driven shutter used for an automatic exposure camera, and more specifically to a motor driven camera for achieving an automatic exposure by controlling the shutter blades and the diaphragm blades with a single motor.

BACKGROUND OF THE INVENTION

An example of the above-mentioned motor driven shutter is disclosed, for example, in Japanese Published Unexamined Patent Application No. 3-89331. In this shutter, two sets of sectors are used to increase the shutter speed; that is, one set of sectors serves to open the shutter at a high speed, and the other set of sectors serves to set the aperture of the diaphragm and further to close the shutter. In other words, when not released, the first set of sectors are closed for light shading, and the second set of sectors are opened so as to provide a required exposure. When released, the first set of sectors are opened at high speed, and the exposure is attained through the second set of sectors. The exposure is completed when the second set of sectors are closed at a predetermined timing.

In the prior art motor driven shutter, however, since a second sector actuating electromagnet, a first sector actuating electromagnet, and an electromagnet controlling circuit for controlling these magnets are required as the control means, in addition to the stepping motor as the driving control means, the structure thereof is complicated; the structure is large and its cost is high and therefore the structure is subject to increased problems.

SUMMARY OF THE INVENTION

The object of the present invention is to overcome the above-mentioned problems. To achieve the above-mentioned object, the present invention provides a motor driven shutter having a single motor controlled in both forward and reverse rotations, and diaphragm blades and shutter blades controlled by the motor. A driving member is operated by the motor. A diaphragm member sets the diaphragm blades to a predetermined position via the driving member upon forward rotation of the motor. A closing member is engaged at a charge position to operate the diaphragm blades to a closed position. Shutter blades are engaged at a closed position and urged in an open direction. The driving member sets the diaphragm blades to a predetermined position and further releases the shutter blades by releasing the engagement during the reverse rotation of the motor in a diaphragm setting process, and closes the diaphragm blades by releasing the engagement of the closing member during the succeeding operation of the motor.

In the motor driven shutter described above, the motor driven shutter can be driven and controlled by a single motor, so that it is possible to simplify the structure and control operation of the motor driven shutter, and therefore to reduce the size and cost thereof.

BRIEF DESCRIPTION OF THE DRAWINGS

In order that the invention may be more clearly understood, it will now be described in greater detail with reference to the accompanying drawings, wherein.

DESCRIPTION OF THE PREFERRED EMBODIMENTS

Figure 1:
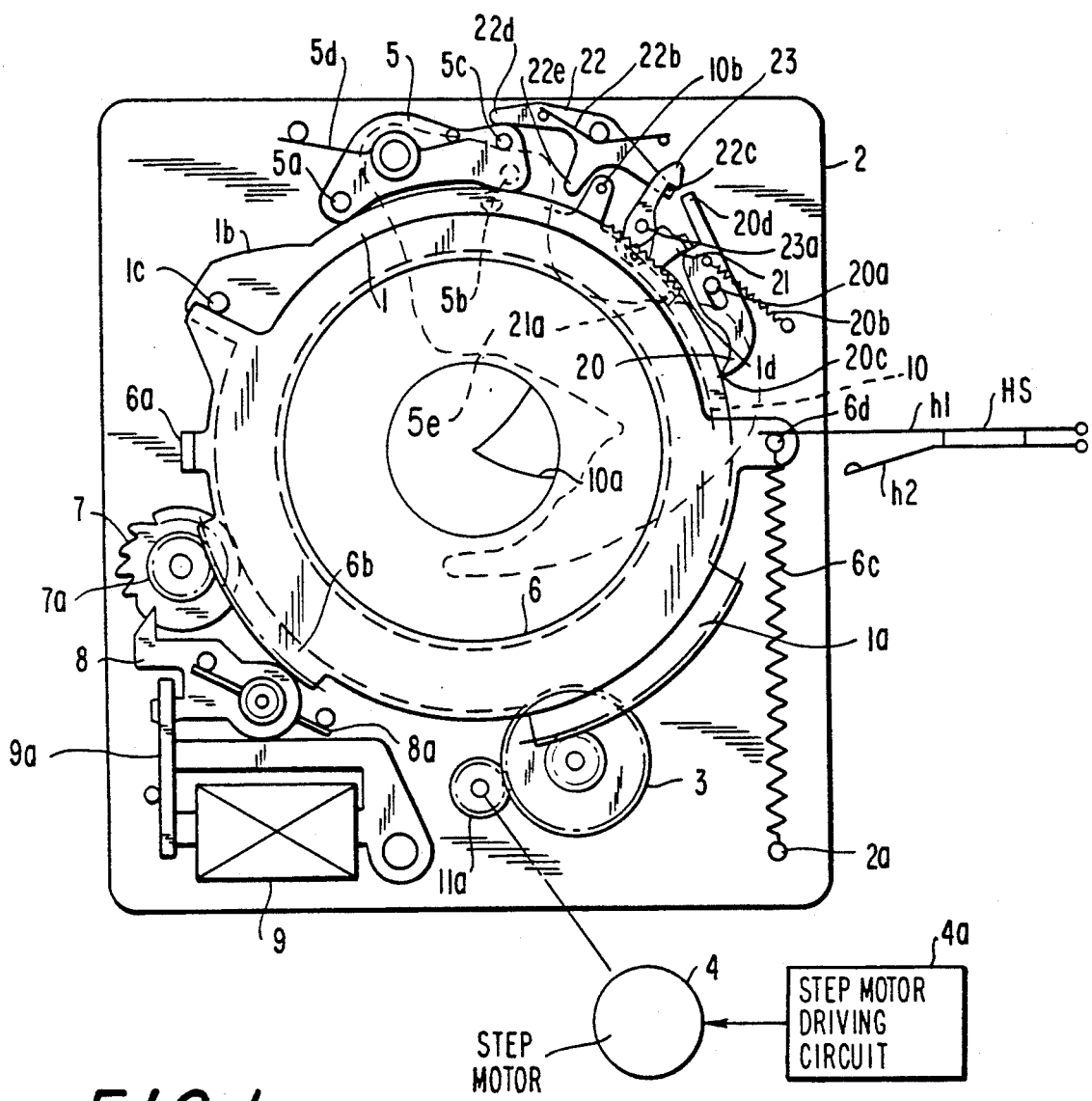
FIG. 1 is a structural view showing one embodiment of the motor driven shutter according to the present invention.
Figure 2:
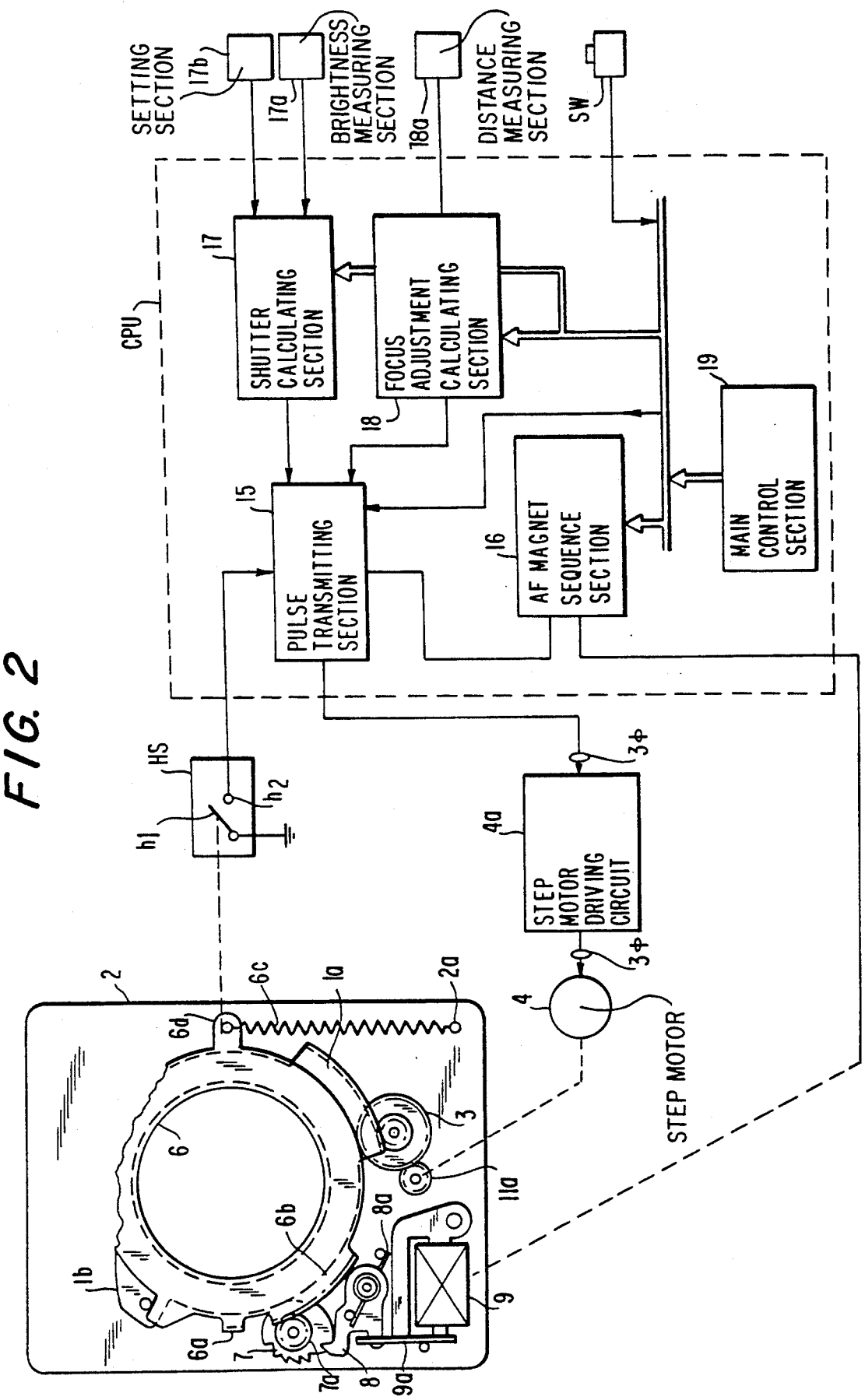
FIG. 2 is a block diagram showing the control system for controlling the motor driven shutter shown in FIG. 1.

The present invention will be described hereinbelow with reference to the attached drawings. FIGS. 1 to 5 show an embodiment of the motor driven shutter of the present invention. In FIGS. 1 and 2, the symbol HS denotes a home switch for outputting an operation start confirming signal. The home switch HS is a normally closed switch having a movable contact h1 and a fixed contact h2. The movable contact h1 is supported at one end by a pin 6d on a distance ring 6. A spring 6c is disposed between the pin 6d and a base plate 2a. The distance ring 6 is always urged in the clockwise direction by the elastic force of this spring 6c. When a release button SW is not depressed, the distance ring 6 is located at its home position as shown in FIG. 1, in which the home switch HS is held open by the pin 6d. When the release button SW shown in FIG. 2 is depressed, the supply voltage is turned on at the first stroke of the switch button so that a sequence of the automatic focusing operation (lens drive) is executed. Further, at the second stroke of the switch button, an exposure operation and a film winding-up operation are executed.

A pinion 11a fixed to one end of a step motor 4 drives a driving ring to rotate a rachet wheel 7 in the clockwise direction via the driving ring 1 and the distance ring 6 when the step motor 4 is rotated in the reverse direction, so that an engage lever 8 is pushed upward. When an electromagnet 9 is energized at this time, the end portion of the engage lever 8 is held at a position away from the engagement position with the toothed portions of the rachet wheel 7. Thereafter, the step motor 4 rotates in the forward direction in a focusing operation, to transmit rotational motion to the driving ring 1 disposed on the base plate 2 via the pinion 11a fixed to a rotation transmission shaft, so that the distance ring 6 is rotated in the clockwise direction in the drawing via the spring 6c. When the distance ring 6 rotates in the clockwise direction, the movable contact h1 of the opened home switch HS is brought into contact with the fixed contact h2, due to the resulting movement of the pin 6d, to close the home switch HS.

The movable contact h1 of the home switch HS is connected to a reference potential point, and the fixed contact h2 thereof is connected to an input side of a forward and reverse rotation pulse transmitting section 15 of a control circuit CPU, as seen in FIG. 2. The number of pulses transmitted by the forward and reverse rotation pulse transmitting section 15 is determined by a shutter calculating section 17 and a focus adjustment calculating section 18 of the control circuit CPU. When the home switch HS is not closed, the forward and reverse rotation pulse transmitting section 15 cannot transmit a phase pulse to a step motor driving circuit 4a. Further, the forward and reverse rotation pulse transmitting section 15, the shutter calculating section 17, the focus adjustment calculating section 18 and an AF magnet sequence section 16 are all controlled by programs stored in a main control section 19 comprised of a ROM and a RAM. When the AF magnet sequence section 16 is controlled by the main control section 19, the AF magnet sequence section 18 executes a sequential control such that three reverse rotation pulses are transmitted; the electromagnet 9 is operated; and then seven forward rotation pulses are transmitted.

Figure 3:
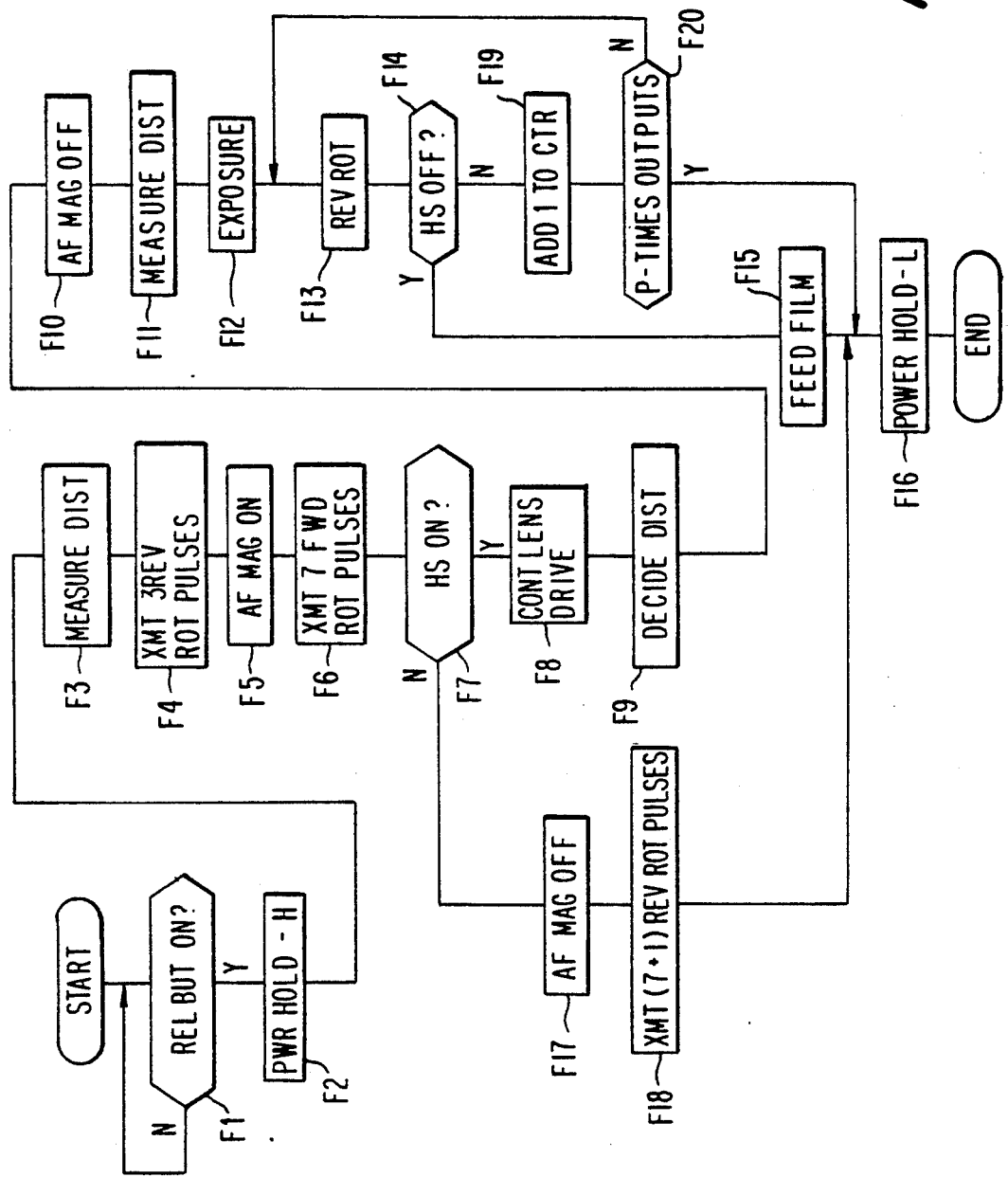
FIG. 3 is a flowchart showing the control sequence of the control system shown in FIG. 2.
Figure 4:
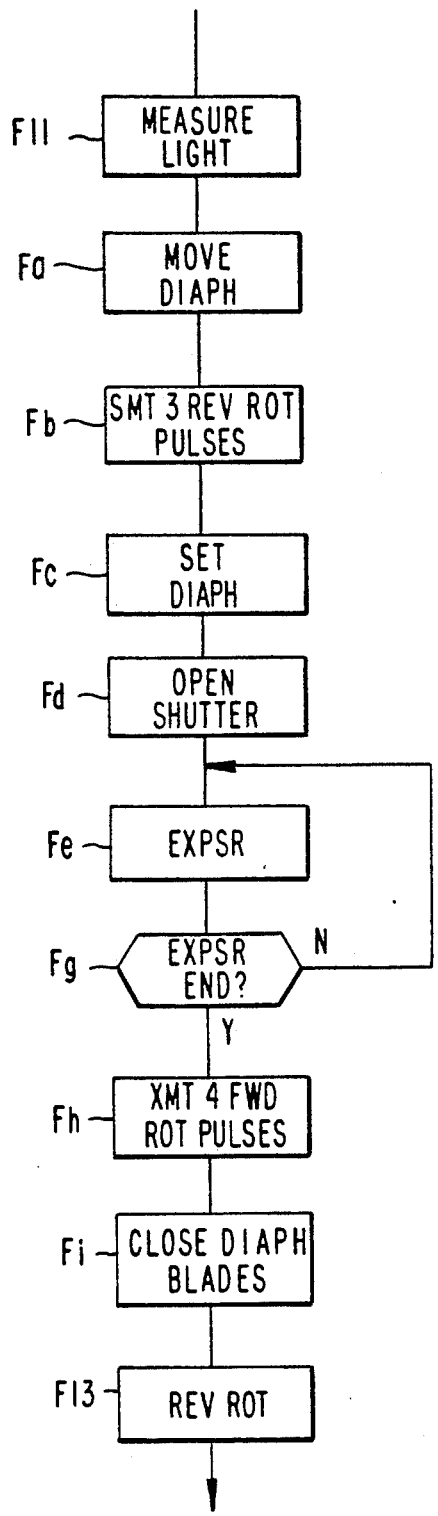
FIG. 4 is a flowchart showing a detailed process of the step F12 of the flowchart shown in FIG. 3.

In the camera described above, when the release button SW shown in FIG. 2 is depressed, an operation sequence as shown by a flowchart in FIG. 3 is executed. The depression of the release button SW turns on the supply voltage (in F1), so that the power is held at H (in F2). The distance to the subject is measured by a distance measuring section 18a shown in FIG. 2 (in F3), and the focus adjustment is calculated by the focus adjustment calculating section 18. Three reverse rotation pulses are transmitted from the AF magnet sequence section 16 to the step motor 4 via the forward and reverse rotation pulse transmitting section 15 and the step motor driving circuit 4a (in F4). When three reverse rotation pulses have been transmitted to the step motor 4, the rachet wheel 7 rotates in the clockwise direction and pushes the engagement lever 8 upward. Under these conditions, the AF magnet sequence section 16 outputs a signal to the electromagnet 9 for a retracting operation (in F5). The operation of the electromagnet 9 holds the engagement lever 8 at a position where the end portion of the engage lever 8 is kept away from the engagement position with the tooth portions of the rachet wheel 7. Under control of the AF magnet sequence section 16, seven forward rotation pulses are transmitted from the forward and reverse rotation pulse transmitting section 15 to the step motor 4 to execute the lens drive operation (in F6).

The on or off operation of the home switch HS is detected by this lens driving operation (in F7). When the home switch HS is closed, the forward rotation pulse determined by the focus adjustment calculating section 18 is transmitted to the step motor 4 via the forward and reverse rotation pulse transmitting section 15 (in F8). When an appropriate displacement of the wheel 7 is obtained in the lens driving operation (in F9), the retracting operation of the AF magnet is turned off (in F10). When the release button SW is depressed to the second stroke position, the measuring section 17a measures the brightness of an object to be photographed (in F11), and the shutter calculating section 17 calculates the diaphragm aperture and the shutter speed on the basis of the set contents of a setting section 17b and under various conditions such as the above-mentioned measurement values and the film sensitivity, according to the respective modes of diaphragm priority, shutter speed priority, depth-of-field program, dynamic object program, etc.

Thereafter, an exposure operation is executed (in F12). This exposure operation will be described hereinbelow in further detail with reference to a flowchart shown in FIG. 4. After the engagement lever 8 engages the rachet wheel 7 due to the turn-off operation of the electromagnet 9, when the driving ring 1 is further rotated in the clockwise direction by the step motor 4, the pin 1c is moved away form the distance ring 6, so that a cam portion 1b pushes the pin 5a of the diaphragm lever 5 upward. When the motor 4 rotates through an angular distance corresponding to the number of the pulses applied to the motor, the diaphragm lever 5 is pivoted by the cam portion 1b, so that the opened diaphragm blades 5e are set to a predetermined aperture position by the pin 5b (in Fa) coupled thereto. In more detail, in FIG. 1, the driving ring 1 is rotated to a position slightly further than this predetermined diaphragm aperture position and then the motor 4 is reversed (in Fb), so that an engage stepped portion 1d engages a projection 20c of the set lever 20 to push the set lever 20 against the spring 20b in the upward and leftward direction in the drawing. The set lever 20 is urged in the clockwise direction by the spring 20 to slide in the lower right hand direction. Therefore, the set lever 20 is shifted by the engage stepped portion 1d via the projection 20c, so that the position at which the motor 4 stops corresponds to the set value of the diaphragm (Fc). At this moment, the aperture is fixed at D as shown by the curve A in FIG. 5. When the set lever 20 is shifted against the spring 20b, the roughly L-shaped opening claw 21 is urged by the stepped portion of the set lever 20 to be pivoted in the counterclockwise direction, so that the curved portion 21a shown on the lower and right side in FIG. 1 is released from the stepped portion of the opening ring 10. Therefore, the opening ring 10, previously urged in the clockwise direction by a spring (not shown), is quickly pivoted in the same direction, to quickly open the shutter blades 10a coupled thereto from the closed condition as shown by the curve B in FIG. 5. On the other hand, during the course of shift movement against the spring 20b, the set lever 20 stops the pivotal motion of the closing lever 22 because the projection 20d enters the pivotal range of the curved portion 22c of the closing lever 22, and simultaneously pushes the pin 23a of the closing claw 23 via an opening claw 21 to release the engagement with the curved portion 22c (in Fe).

After the shutter blades 10a have been opened and a required exposure time has been elapsed (in Fg), the motor 4, once stopped, begins to rotate again in the forward direction (in Fh), the set lever 20 is moved by the spring 20c, so that the engagement between the projection 20d and the curved portion 22c is released. When this engagement is released, the closing lever 22 is quickly pivoted in the counterclockwise direction by the spring 22b. Since the projection 22d pushes the pin 5c and pivots the diaphragm lever 5 in the clockwise direction against the spring 5d, the diaphragm blades are closed as shown by the curve A in FIG. 5, so that the exposure ends (Fi). As described above, the camera exposes the film according to the exposure value determined by the aperture D and the exposure time T as shown by the hatched portion in FIG. 5.

The closing lever 22 pivots the set lever 20 at the end of its pivotal motion in the counterclockwise direction by the well-known method (not shown), to move the projection 20c away from the operating range of the engage stepped portion 1d. Thereafter, when the motor 4 rotates in the reverse direction (in F13), although the respective members are returned by the driving ring to the respective home positions as shown in FIG. 1, the opening ring 10 is rotated in the counterclockwise direction against the spring (not shown), to close the shutter blades. After that, the projection 22e is pushed by the pin 10b, and the closing lever 22 is pivoted in the clockwise direction to engage the curved portion 22c with the closing claw 23. Therefore, the diaphragm lever 5 is pivoted by the spring 5d in the counterclockwise direction to open the diaphragm blades again.

After the exposure operation has been executed as described above (in F12), the main control section 19 commands the forward and reverse rotation pulse transmitting section 15 to transmit a reverse rotation pulse to the step motor 4 (in F13). When the motor 4 rotates in the reverse direction, the respective members are returned to the respective home positions by the driving ring 1. Successively, the control discriminates whether the home switch HS is closed or opened. If opened, the film is fed (in F15) and the supply voltage is turned off (in F16). If not closed, in the above step F7, the AF magnet 9 is immediately turned off (in F17), and the reverse rotation pulse is transmitted seven times to restore to the home position (in F18). When the restoration to the home position is not confirmed in step F14 above, the reverse rotation pulse is transmitted again in the steps F19 and F20. A series of the operations of the motor driven shutter ends as described above.

In the above-mentioned embodiment, although the shutter blades are opened via the opening ring 10, it is also possible to realize such a structure that the shutter blades are directly opened without use of the opening ring 10. Further, in the above-mentioned embodiment, the engage lever 8, and the rachet wheel 7 are driven by controlling the electromagnet 9 to hold the distance ring 6 at the predetermined position. Alternatively, without use of these members, it is possible to engage the distance ring 6 at the predetermined position by an engage member; that is, by providing a setting lever (a member having the same function as the set lever 20) engaged with the sector gear 6b and an engage member (e.g. a member having the same function as the closing lever 22) linked with the set lever, and by rotating the motor 4 in the reverse direction during the rotation process of the driving ring 1 in the forward direction for focus adjustment so that the sector gear 6b is moved by the set lever. Further, in the above embodiment, although the shutter blades are opened when the opening ring 10 is released and then pivoted, it is also possible to open the shutter blades 10a by operating the blades to the open and closed positions alternatively with the use of a step motor, for instance.

Figure 5:
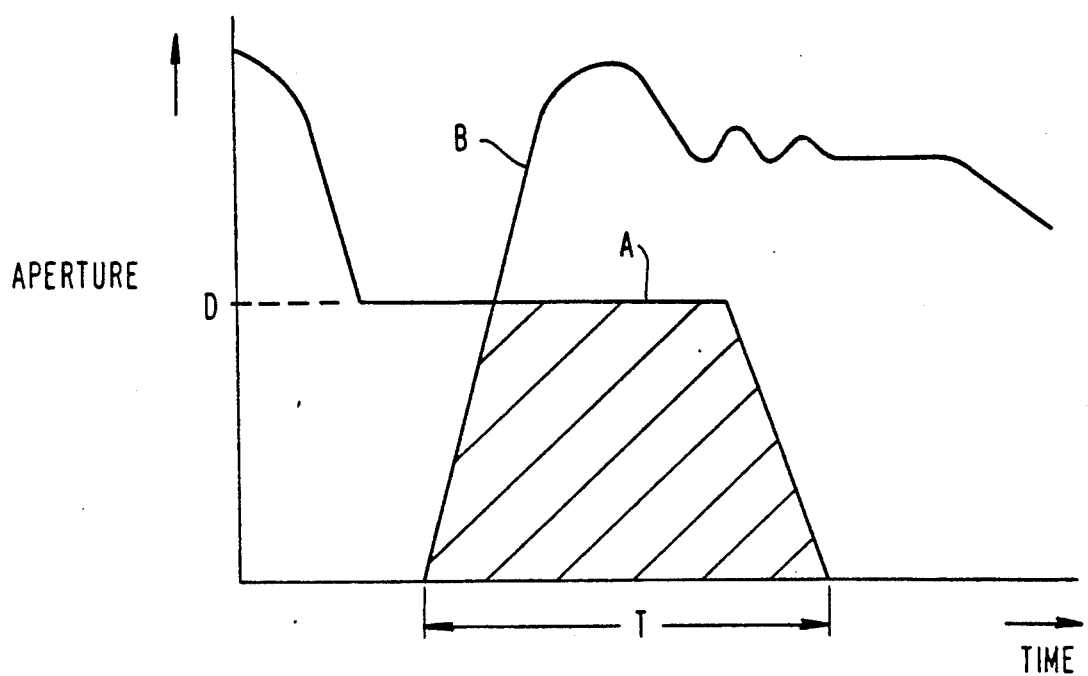
FIG. 5 is a graphical representation showing the exposure characteristics showing the operational relationship between the diaphragm blades and the shutter blades.

Further, in the above embodiment, although the diaphragm lever 5 opens the diaphragm blades as shown in FIG. 5, in normal conditions, it is also possible to close the diaphragm blades in the normal condition shown in FIG. 1. In this case, an intermediate member is interposed between the pin 5a and the cam portion 1b. Further, the operation that the closing lever 22 is engaged with the closing claw 23 by the engagement between the pin 10b and the projection 22e can be made at the same time when the motor 4 is rotated in the reverse direction to rotate the rachet wheel 7 and further to move the engage lever 8, not at the end of a series of the operations of the motor driven shutter as the above-mentioned embodiment, but the early stage of the succeeding operation thereof.

Further, in the above-mentioned embodiment, although the operation for closing the shutter blades to complete the exposure is made by rotating the motor 4 in the forward direction again to release the engagement between the curved portion 22c and the projection 20d so that the closing lever 22 is pivoted, it is possible to eliminate the projection 20d and to allow the closing lever 22 to pivot by increasing the shift motion length of the set lever 20 relative to the pin 20a and by rotating the motor 4 additionally in the reverse direction so that the closing claw 23 is released to pivot the closing lever 22. Furthermore, in the above-mentioned embodiment, although a step motor is used as the power source, it is also possible to obtain the same effect by using an ultrasonic motor, a direct current motor having an encoder, etc.

As described above, according to the present invention, the driving ring 1 is operated with the shutter blades 10a closed, the diaphragm blades are then moved to a predetermined position by the diaphragm lever 5 moved by the cam portion 1b; the diaphragm aperture value is set by rotating the motor in the reverse direction; the shutter is opened simultaneously; and then the diaphragm blades are closed by rotating the motor 4. Accordingly, it is possible to perform a series of the diaphragm setting operation and the shutter opening and closing operation by using a single motor as a driving source, thus simplifying the construction and thereby reducing the portions at which trouble may occur. In addition, since only a single power source is used, the control circuit is simple.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What I claim is:

1. A motor driven shutter control device for a shutter having diaphragm blades and shutter blades, means for controlling the diaphragm blades and means for controlling the shutter blades, said device comprising a single motor, means for selectively controlling said motor for rotation in either of first and second opposite directions, and driving member coupled to be driven by the motor; wherein said means for controlling the diaphragm blades comprises a diaphragm setting member coupled to the driving member for setting the diaphragm blades to a predetermined position in response to rotation of the motor in said first direction, in a diaphragm setting operation, and a diaphragm closing member coupled to move the diaphragm blades to a closed position; said means for controlling said shutter blades comprising means coupled to said driving member to enable said shutter blades to move in a shutter opening direction, during said diaphragm setting operation, during rotation of the motor in said second direction, said means for moving said diaphragm blades to a closed position comprising means for releasing the closing member during an operation following said diaphragm setting operation with the shutter blades in an open position.

2. A motor driven shutter control device for a shutter having diaphragm blades and normally closed shutter blades, means for controlling the diaphragm blades and means for controlling the shutter blades, said device comprising a single motor, means for selectively controlling said motor for rotation in either of first and second opposite directions, a driving member coupled to be driven by the motor; wherein said means for controlling the diaphragm blades comprises means responsive to rotation of said motor in a first direction for setting the diaphragm blades to a predetermined position, and diaphragm closing means coupled to move the diaphragm blades to a closed position; said means for controlling said shutter blades comprising means responsive to rotation of said motor in said second direction, immediately following said rotation of said motor in said first direction, for releasing said shutter blades for movement in a shutter opening direction, said diaphragm closing means comprising means for moving said diaphragm blades to a closed position in response to rotation of said motor in said first direction following said rotation of said motor in said second direction with the shutter blades in an open position.

3. The motor driven shutter control device of claim 2, wherein said driving member comprises a ring rotatable by said motor, and said means for setting said diaphragm blades comprises a lever coupled to set said diaphragm blades, and cam means on said ring coupled to pivot said lever.

4. The motor driven shutter control device of claim 2, wherein said driving member comprises a ring rotatable by said motor, said ring having a notched circumferential region, and said means for releasing said shutter comprises a lever having a projection engaging said notched portion, said lever being movable in a direction perpendicular to its axis between first and second positions, means for biasing said lever in said first position, said lever being movable to said second position upon rotation of said motor in said second direction, and means responsive to movement of said lever to said second position for controlling said shutter blades to open.

5. The motor driven shutter control device of claim 4 when said lever comprises means, in said second position of said lever, for inhibiting movement of said diaphragm closing means in a direction to close said diaphragm blades, said lever releasing said diaphragm closing means in said first position of said lever.

6. The motor driven shutter control device of claim 5 further comprising latch means mounted to releasably hold said diaphragm closing means, said lever being mounted to release said latch means in said second position of said lever.

7. A method for controlling a camera shutter having diaphragm blades and normally closed shutter blades and a single motor having first and second opposite directions of rotation, said method comprising rotating said motor in said first direction, in a first rotation step, setting said diaphragm blades to a predetermined position in response to said first rotation step, rotating said motor in said second direction, in a second rotation step, opening said shutter blades in response to said second rotation step of said motor immediately following said first step, rotating said motor in said first direction in a third rotation step a predetermined time following said second rotation step, and closing said diaphragm blades in response to rotation of said motor in said third rotation step while said shutter blades are open.

* * * * *